(12) United States Patent
Baumgartner et al.

(10) Patent No.: US 10,305,309 B2
(45) Date of Patent: May 28, 2019

(54) ELECTRICAL ENERGY STORAGE SYSTEM WITH BATTERY STATE-OF-CHARGE ESTIMATION

(71) Applicant: Con Edison Battery Storage, LLC, Valhalla, NY (US)

(72) Inventors: Ryan A. Baumgartner, Milwaukee, WI (US); Michael J. Wenzel, Grafton, WI (US)

(73) Assignee: Con Edison Battery Storage, LLC, Valhalla, NY (US)

( * ) Notice: Subject to any disclaimer, the term of this patent is extended or adjusted under 35 U.S.C. 154(b) by 0 days.

(21) Appl. No.: 15/406,593

(22) Filed: Jan. 13, 2017

(65) Prior Publication Data

US 2018/0034285 A1 Feb. 1, 2018

Related U.S. Application Data

(60) Provisional application No. 62/368,869, filed on Jul. 29, 2016.

(51) Int. Cl.
*H02J 3/32* (2006.01)
*H02J 7/00* (2006.01)
(Continued)

(52) U.S. Cl.
CPC ........... *H02J 7/007* (2013.01); *H01M 10/441* (2013.01); *H02J 7/0021* (2013.01); *H02J 7/35* (2013.01);
(Continued)

(58) Field of Classification Search
CPC ............. H02J 7/007; H02J 7/35; H02J 7/0021
See application file for complete search history.

(56) References Cited

U.S. PATENT DOCUMENTS

| 2010/0090532 A1* | 4/2010 | Shelton | ............... | H02J 3/32 307/46 |
| 2014/0028321 A1* | 1/2014 | Bourgeois | ............ | G01R 31/362 324/427 |

(Continued)

FOREIGN PATENT DOCUMENTS

| CN | 105515032 | | 4/2016 |
| JP | 2015059924 A | * | 10/1994 |
| JP | 2016114469 A | * | 10/1994 |

OTHER PUBLICATIONS

U.S. Appl. No. 15/247,777, filed Aug. 25, 2016, Johnson Controls Technology Company.

(Continued)

*Primary Examiner* — Drew A Dunn
*Assistant Examiner* — Sailesh Thapa
(74) *Attorney, Agent, or Firm* — Michael Best & Friedrich LLP

(57) ABSTRACT

An electrical energy storage system includes a battery configured to store electrical energy and discharge the stored electrical energy to an external system, a switch electrically connected to the battery and operable to connect the battery to the external system and disconnect the battery from the external system, a sensor configured to measure an open circuit voltage of the battery while the battery is disconnected from the external system, and a controller. The controller is configured to predict usage of the battery at a plurality of future times, schedule a time to disconnect the battery from the external system based on the predicted usage of the battery at the plurality of future times, operate the switch to disconnect the battery at the scheduled time, and obtain a measurement of the open circuit voltage of the battery while the battery is disconnected.

20 Claims, 5 Drawing Sheets

(51) Int. Cl.
*H02J 7/35* (2006.01)
*H01M 10/44* (2006.01)
*H01M 10/48* (2006.01)

(52) U.S. Cl.
CPC ........ *H01M 10/48* (2013.01); *H01M 2220/10* (2013.01); *H02J 3/32* (2013.01)

(56) References Cited

U.S. PATENT DOCUMENTS

| | | | |
|---|---|---|---|
| 2014/0188295 A1* | 7/2014 | Saito | G05B 15/02 700/291 |
| 2015/0316902 A1 | 11/2015 | Wenzel et al. | |
| 2015/0316907 A1 | 11/2015 | Elbsat et al. | |
| 2016/0377306 A1 | 12/2016 | Drees et al. | |

OTHER PUBLICATIONS

U.S. Appl. No. 15/247,784, filed Aug. 25, 2016, Johnson Controls Technology Company.
U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls Technology Company.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, filed Aug. 25, 2016, Johnson Controls Technology Company.
U.S. Appl. No. 15/247,883, filed Aug. 25, 2016, Johnson Controls Technology Company.
U.S. Appl. No. 15/247,885, filed Aug. 25, 2016, Johnson Controls Technology Company.
U.S. Appl. No. 15/247,886, filed Aug. 25, 2016, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,245, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 8, 2015, Johnson Controls Technology Company.
Donadee et al., AGC Signal Modeling for Energy Storage Operations, Sep. 2014, 2 pages.
Taylor et al., Forecasting Frequency-Corrected Electricity Demand to Support Frequency Control, May 2016, 8 pages.
Search Report and Written Opinion for International Application No. PCT/US2017/014193, dated Apr. 18, 2017, 17 pages.

* cited by examiner

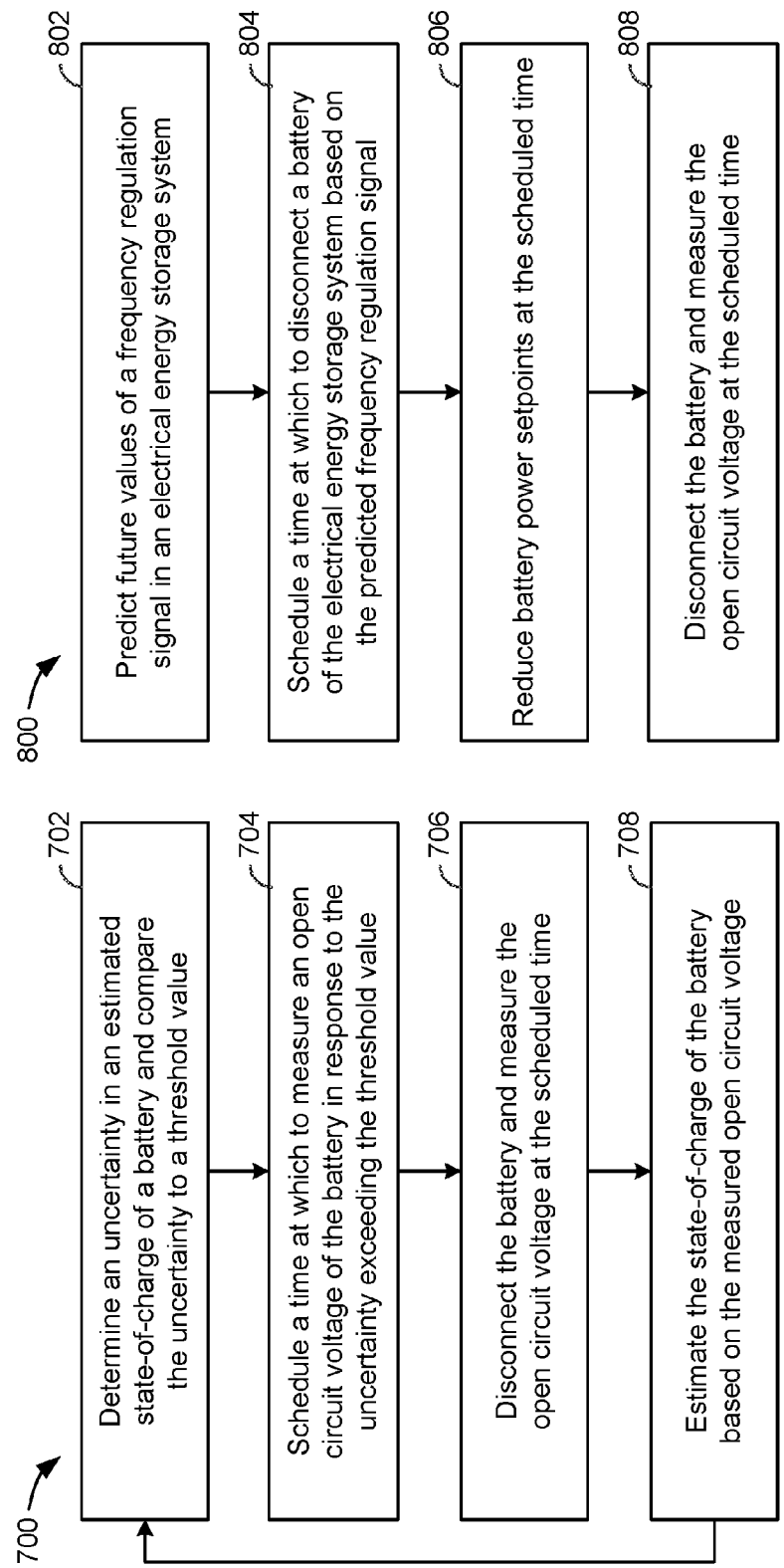

ELECTRICAL ENERGY STORAGE SYSTEM WITH BATTERY STATE-OF-CHARGE ESTIMATION

CROSS-REFERENCE TO RELATED PATENT APPLICATION

This application claims the benefit of and priority to U.S. Provisional Patent Application No. 62/368,869 filed Jul. 29, 2016, the entire disclosure of which is incorporated by reference herein.

BACKGROUND

The present disclosure relates generally to an electrical energy storage system. The present disclosure relates more particularly to an electrical energy storage system which estimates the state-of-charge of batteries used to store electrical energy.

Electrical energy storage (e.g., batteries) can be used for several applications, two of which are ramp rate control and frequency regulation. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation (also referred to as frequency response) is the process of maintaining the grid frequency at a desired value (e.g. 60 Hz in the United States) by adding or removing energy from the grid as needed. During a fluctuation of the grid frequency, a frequency regulation system may offset the fluctuation by either drawing more energy from the energy grid (e.g., if the grid frequency is too high) or by providing energy to the energy grid (e.g., if the grid frequency is too low). A facility participating in a frequency regulation program may receive a regulation signal from a utility or other entity responsible for regulating the frequency of the energy grid. In response to the regulation signal, the facility adds or removes energy from the energy grid. The facility may be provided with monetary incentives or awards in exchange for participating in the frequency regulation program.

Storing electrical energy in a battery may allow a facility to perform frequency regulation and/or ramp rate control. However, repeatedly charging and discharging the battery may cause battery degradation and reduce battery life. Battery degradation can affect various operating parameters such as the battery's maximum state-of-charge and charging/discharging power. Changes in these parameters can decrease the battery's ability to store and discharge energy and can reduce the potential for participating in frequency regulation programs. Optimal battery control often relies upon accurate values for these operating parameters. However, it can be difficult to measure battery degradation and predict the resultant change in battery operating parameters.

SUMMARY

One implementation of the present disclosure is an electrical energy storage system. The system includes a battery configured to store electrical energy and discharge the stored electrical energy to an external system, a switch electrically connected to the battery and operable to connect the battery to the external system and disconnect the battery from the external system, a sensor configured to measure an open circuit voltage of the battery while the battery is disconnected from the external system, and a controller. The controller is configured to predict usage of the battery at a plurality of future times, schedule a time to disconnect the battery from the external system based on the predicted usage of the battery at the plurality of future times, operate the switch to disconnect the battery at the scheduled time, and obtain a measurement of the open circuit voltage of the battery while the battery is disconnected.

In some embodiments, the controller is configured to estimate a state-of-charge of the battery based on the measured open circuit voltage of the battery. In some embodiments, the controller is configured to estimate an uncertainty in the state-of-charge of the battery and schedule the time to disconnect the battery in response to a determination that the estimated uncertainty exceeds an uncertainty threshold.

In some embodiments, the controller is configured to determine a time of minimum battery usage based on the predicted usage of the battery at the plurality of future times and schedule the time to disconnect the battery at the time of minimum battery usage.

In some embodiments, the external system includes an energy grid. The controller can be configured to use the battery to participate in a frequency response program by storing electrical energy from the energy grid in the battery and discharging the stored electrical energy to the energy grid. In some embodiments, the controller is configured to operate the battery to store and discharge electrical energy based on a regulation signal received from an incentive provider, predict a value of the regulation signal at each of the plurality of future times, and predict the usage of the battery based on the predicted values of the regulation signal.

In some embodiments, the external system includes a building or campus configured to consume the electrical energy discharged from the battery. The controller can be configured to use the battery to shift an energy load of the building or campus by storing electrical energy in the battery at a first time and discharging the stored electrical energy to the building or campus at a second time. In some embodiments, the controller is configured to operate the battery to store and discharge electrical energy to satisfy the energy load of the building or campus, predict the energy load of the building or campus at each of the plurality of future times, and predict the usage of the battery based on the predicted energy loads of the building or campus.

In some embodiments, the controller is configured to operate the battery to store and discharge electrical energy to achieve battery power setpoints and estimate a state-of-charge of the battery based on the battery power setpoints. In some embodiments, the controller is configured to determine an initial state-of-charge of the battery based on the measured open circuit voltage of the battery, estimate a change in the state-of-charge of the battery resulting from each of the battery power setpoints after the open circuit voltage is measured, and estimate a current state-of-charge of the battery based on the initial state-of-charge of the battery and the estimated change in the state-of-charge of the battery.

Another implementation of the present disclosure is a method for operating an electrical energy storage system. The method includes storing electrical energy in a battery and discharging the stored electrical energy to an external system, predicting usage of the battery at a plurality of future times, scheduling a time to disconnect the battery from the external system based on the predicted usage of the battery at the plurality of future times, operating a switch to disconnect the battery at the scheduled time, and measuring an open circuit voltage of the battery while the battery is disconnected.

In some embodiments, the method includes estimating a state-of-charge of the battery based on the measured open circuit voltage of the battery. In some embodiments, the method includes estimating an uncertainty in the state-of-charge of the battery and scheduling the time to disconnect the battery in response to a determination that the estimated uncertainty exceeds an uncertainty threshold.

In some embodiments, scheduling the time to disconnect the battery includes determining a time of minimum battery usage based on the predicted usage of the battery at the plurality of future times and scheduling the time to disconnect the battery at the time of minimum battery usage.

In some embodiments, the external system includes an energy grid. The method may include using the battery to participate in a frequency response program by storing electrical energy from the energy grid in the battery and discharging the stored electrical energy to the energy grid. In some embodiments, the method includes operating the battery to store and discharge electrical energy based on a regulation signal received from an incentive provider, predicting a value of the regulation signal at each of the plurality of future times, and predicting the usage of the battery based on the predicted values of the regulation signal.

In some embodiments, the external system includes a building or campus configured to consume the electrical energy discharged from the battery. The method may include using the battery to shift an energy load of the building or campus by storing electrical energy in the battery at a first time and discharging the stored electrical energy to the building or campus at a second time. In some embodiments, the method includes operating the battery to store and discharge electrical energy to satisfy the energy load of the building or campus, predicting the energy load of the building or campus at each of the plurality of future times, and predicting the usage of the battery based on the predicted energy loads of the building or campus.

Another implementation of the present disclosure is an electrical energy storage system. The system includes a plurality of battery strings, one or more sensors, and a controller. The battery strings include a first battery string and one or more other battery strings. Each of the battery strings includes one or more batteries configured to store electrical energy and discharge the stored electrical energy to an external system. The sensors are configured to measure open circuit voltages of the battery strings when the battery strings are disconnected from the external system. The controller is configured to predict usage of the battery strings at a plurality of future times, schedule a time to disconnect the first battery string from the external system based on the predicted usage of the battery strings at the plurality of future times, disconnect the first battery string at the scheduled time while keeping the other battery strings connected to the external system, and obtain a measurement of the open circuit voltage of the first battery string while the first battery string is disconnected.

In some embodiments, the controller is configured to estimate a state-of-charge of the first battery string based on the measured open circuit voltage of the first battery string.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 7 is a flow diagram of a process which can be performed by the electrical energy storage system of FIG. 5 to estimate the state-of-charge (SOC) of a battery, according to an exemplary embodiment.

FIG. 8 is a flow diagram of a process which can be performed by the electrical energy storage system of FIG. 5 to obtain an open circuit voltage (OCV) of a battery, according to an exemplary embodiment.

DETAILED DESCRIPTION

Overview

Figure 1:
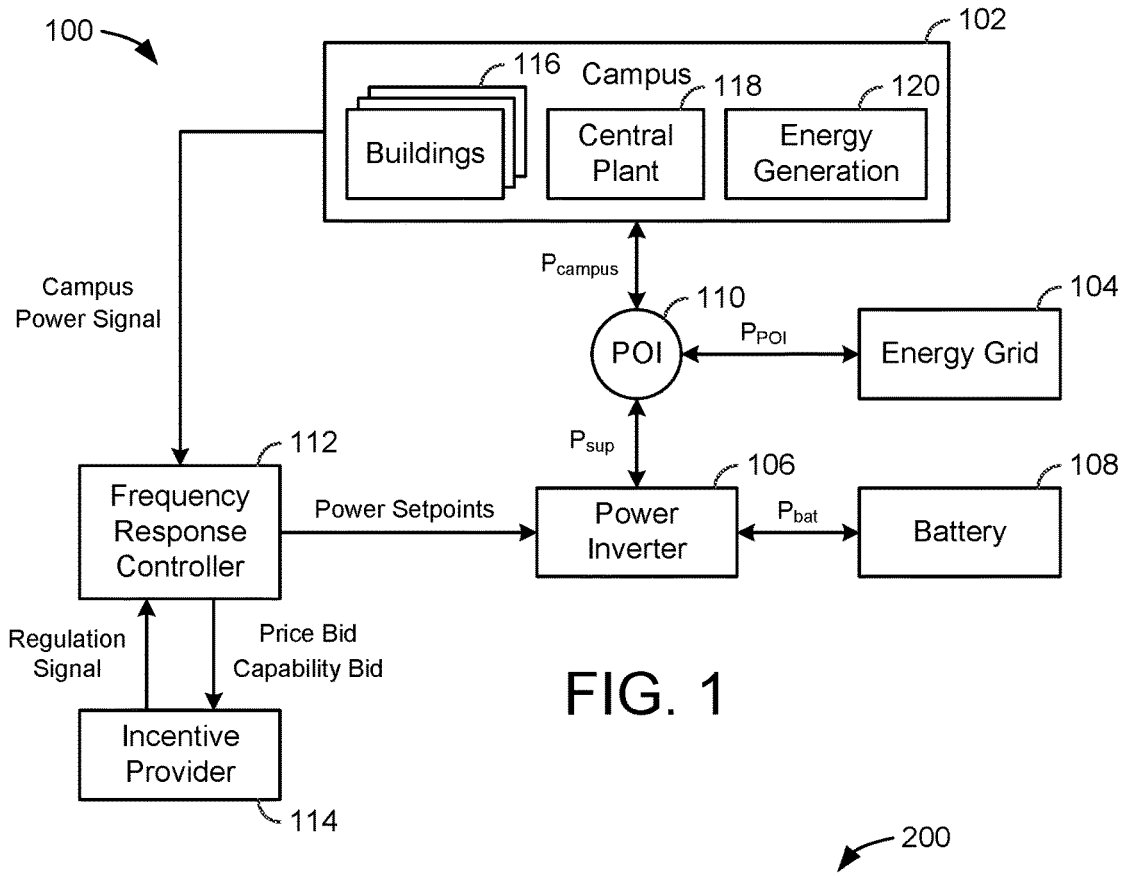
FIG. 1 is a block diagram of a frequency response optimization system, according to an exemplary embodiment.

Referring generally to the FIGURES, systems and methods for controlling and using electrical energy storage are shown, according to various exemplary embodiments. Storing electrical energy in a battery may allow a facility to perform frequency regulation and/or ramp rate control. An electrical energy storage system can include a battery, a battery power inverter, and a controller. The battery can include one or more battery strings. The controller can provide control signals to the battery power inverter to control the rate at which electrical energy is stored or discharged from each of the battery strings In some embodiments, the controller estimates the state-of-charge (SOC) of each battery string based on open circuit voltage (OCV) measurements. The OCV of the battery string can be measured while the battery string is disconnected. The relationship between the SOC of a battery string and the OCV of the battery string can be a function of various known battery parameters (e.g., battery capacity, battery design voltage, battery type, number of batteries in each string, etc.). In some embodiments, the controller uses a stored lookup table or mapping function to calculate the SOC of each battery string as a function of the OCV measurement for the battery string.

The controller can accurately determine the initial SOC of each battery string at the time the OCV of the battery string is measured (i.e., $SOC_0$) based on the measured OCV. The controller can also estimate the SOC of each battery string during operation (e.g., while the battery strings are connected and in use) by tracking the battery power setpoints. For example, the controller can estimate an amount by which the SOC of a battery string increases or decreases (i.e., $\Delta SOC$) as a function of the battery power setpoints at each time step.

In some embodiments, the controller estimates an uncertainty in the SOC values. Each of the SOC values can have an uncertainty associated therewith. The uncertainty in the SOC values can increase over time as more $\Delta SOC$ values are added or subtracted from the initial SOC values $SOC_0$. The increase in uncertainty can result from the uncertainty associated with each $\Delta SOC$ value. As more $\Delta SOC$ values are added or subtracted from the initial SOC value $SOC_0$, the uncertainty in the new SOC value increases. In some embodiments, the controller uses the estimated SOC to determine optimal values for the battery power setpoints.

In some embodiments, the controller compares the uncertainty in the SOC values to an uncertainty threshold. The uncertainty threshold can be defined as a percentage of the SOC, a percentage of the battery capacity, a fixed SOC amount, or any other threshold. In response to a determination that the uncertainty in the SOC for a battery string exceeds the uncertainty threshold, the controller can automatically schedule the battery string to be disconnected so that the OCV of the battery string can be measured. After the battery string has been disconnected, the controller can obtain an OCV measurement. The controller can then use the new OCV measurement to determine a new initial SOC value $SOC_0$ for the battery string.

In some embodiments, the controller schedules a time at which the battery string will be disconnected for an OCV measurement based on a predicted value of a frequency regulation signal. The controller can use the predicted values of the regulation signal to determine an optimal time at which to disconnect a battery string such that the disturbance to frequency response operations are minimized. For example, the controller can select a time at which the regulation signal is predicted to be near zero so that disconnecting the battery string will not significantly affect potential frequency response revenue. These and other features of the electrical energy storage system are described in greater detail below.

The following sections of this disclosure describe the battery SOC estimation technique in greater detail as well as several electrical energy storage systems which can use the estimation technique. For example, the battery SOC estimation technique can be used in a frequency response optimization system. The frequency response implementation is described with reference to FIGS. 1-2. The battery SOC estimation technique can also be used in a photovoltaic (PV) energy system that simultaneously performs both frequency regulation and ramp rate control. The PV energy system implementation is described with reference to FIGS. 3-4. The battery SOC estimation technique is described in greater detail with reference to FIGS. 5-7.

Frequency Response Optimization

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment. In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593, titled "Building Management System for Forecasting Time Series Values of Building Variables" and filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609, titled "High Level Central Plant Optimization" and filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or campus 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some instances, power inverter 106 receives a DC power output from battery 108 and converts the DC power output to an AC power output that can be fed into energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{sup}$ may be positive is power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
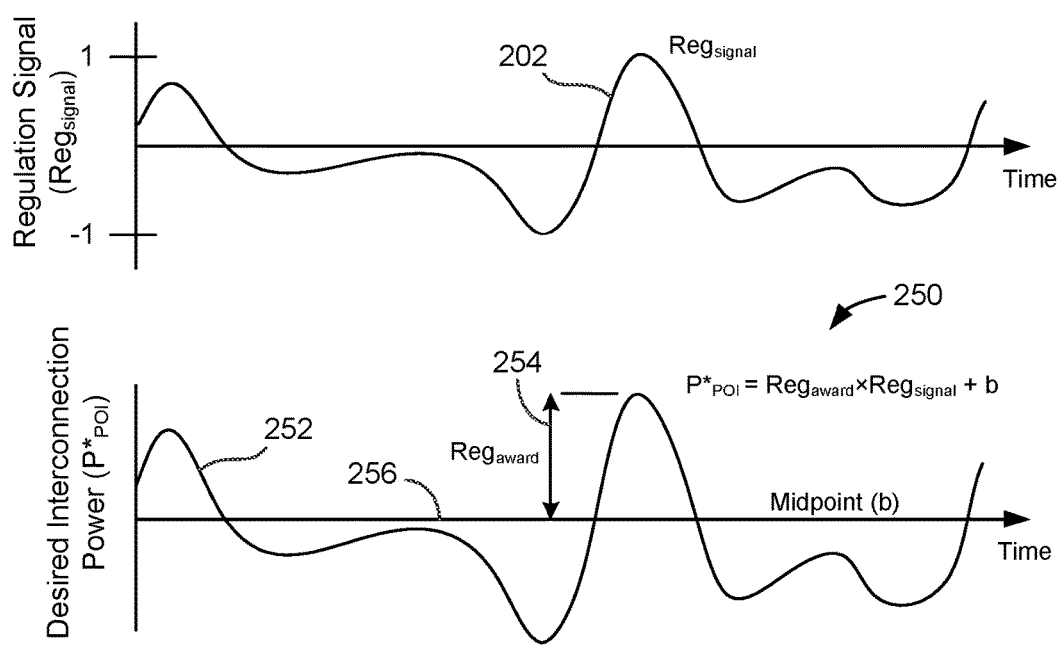
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., $-1 \leq Reg_{signal} \leq 1$). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}$=0.5) may indicate that system 100 is requested to add 5 MW of power at POI 110 relative to midpoint b (e.g., $P_{POI}^*$=10 MW×0.5+b), whereas a regulation signal value of −0.3 may indicate that system 100 is requested to remove 3 MW of power from POI 110 relative to midpoint b (e.g., $P_{POI}^*$=10 MW×−0.3+b).

Graph 250 illustrates the desired interconnection power $P_{POI}^*$ 252 as a function of time. $P_{POI}^*$ 252 may be calculated by frequency response controller 112 based on $Reg_{signal}$ 202, $Reg_{award}$ 254, and a midpoint b 256. For example, controller 112 may calculate $P_{POI}^*$ 252 using the following equation:

$$P_{POI}^* = Reg_{award} \times Reg_{signal} + b$$

where $P_{POI}^*$ represents the desired power at POI 110 (e.g., $P_{POI}^* = P_{sup} + P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MVV) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary processes for calculating and/or optimizing midpoint b under both the constant SOC scenario and the variable SOC scenario are described in detail in U.S. Provisional Patent Application No. 62/239,246 filed Oct. 8, 2015, the entire disclosure of which is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}^* = Reg_{award} \times Reg_{signal} + b$$

where $P_{POI}^* = P_{sup} + P_{campus}$. Positive values of $P_{POI}^*$ indicate energy flow from POI 110 to energy grid 104. Positive values of $P_{sup}$ and $P_{campus}$ indicate energy flow to POI 110 from power inverter 106 and campus 102, respectively. In other embodiments, controller 112 generates the power setpoints using the equation:

$$P_{POI}^* = Reg_{award} \times Res_{FR} + b$$

where $Res_{FR}$ is an optimal frequency response generated by optimizing a value function.

Controller 112 may subtract $P_{campus}$ from $P_{POI}^*$ to generate the power setpoint for power inverter 106 (i.e., $P_{sup} = P_{POI}^* - P_{campus}$). The power setpoint for power inverter 106 indicates the amount of power that power inverter 106 is to add to POI 110 (if the power setpoint is positive) or remove from POI 110 (if the power setpoint is negative). Exemplary processes for calculating power inverter setpoints are described in detail in U.S. Provisional Patent Application No. 62/239,246.

Photovoltaic Energy System With Frequency Regulation and Ramp Rate Control

Figure 3:
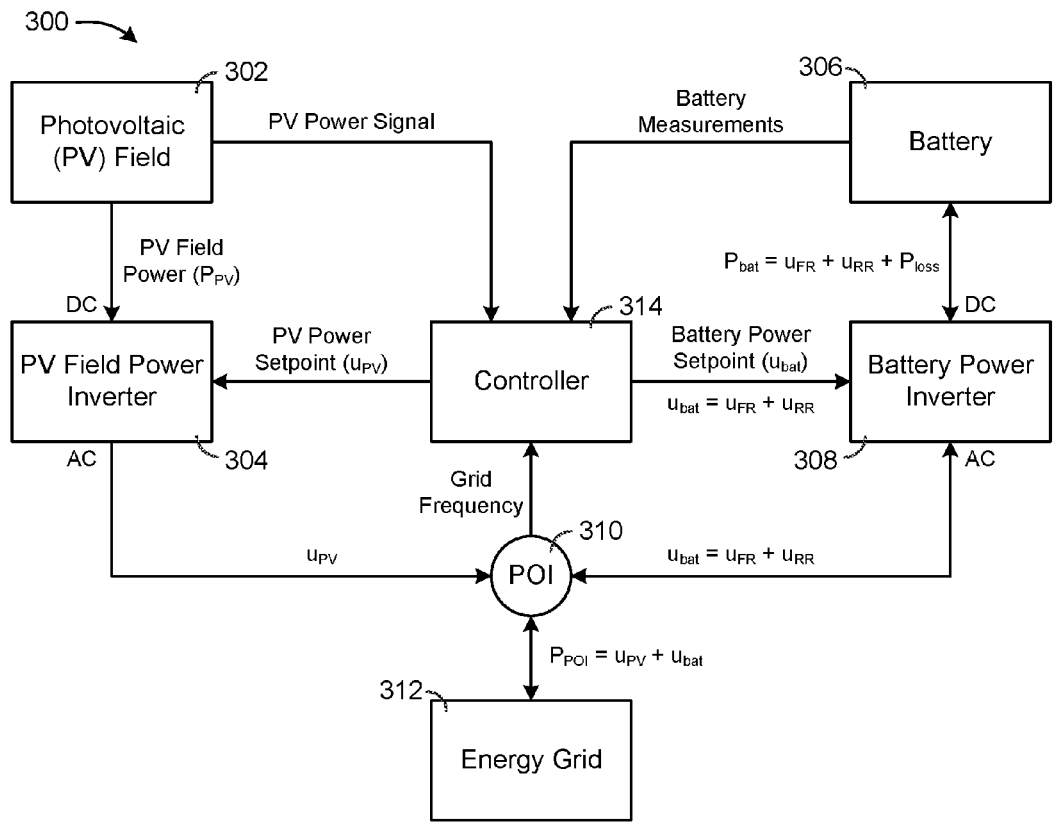
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
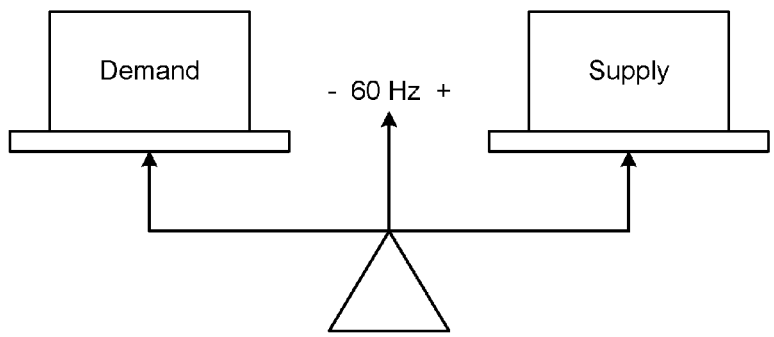
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range. An exemplary controller which can be used as controller 314 and exemplary processes which may be performed by controller 314 to generate the PV power setpoint $u_{PV}$ and the battery power setpoint $u_{bat}$ are described in detail in U.S. Provisional Patent Application No. 62/239,245 filed Oct. 8, 2015, the entire disclosure of which is incorporated by reference herein.

Electrical Energy Storage System With Battery State-of-Charge Estimation

Figure 5:
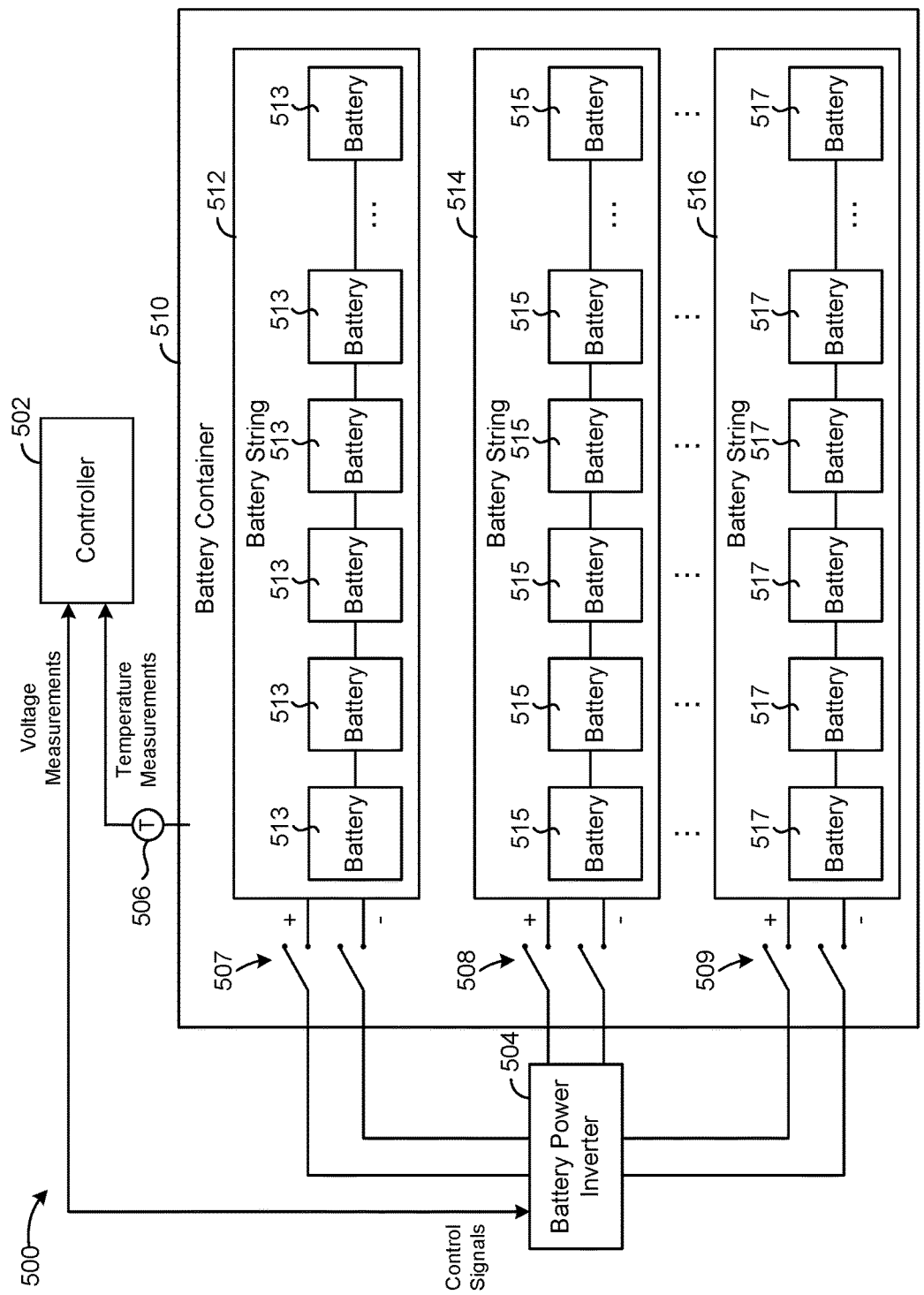
FIG. 5 is a block diagram of an electrical energy storage system which can be implemented as part of the frequency response optimization system of FIG. 1 and/or the photovoltaic energy system FIG. 3, according to an exemplary embodiment.

Referring now to FIG. 5, an electrical energy storage system 500 is shown, according to an exemplary embodiment. System 500 can be used to monitor and control electrical energy storage in one or more batteries. System 500 can be implemented as part of a frequency response optimization system (e.g., system 100), a photovoltaic energy system (e.g., system 300), a ramp rate control system, a building management system, or any other system that stores electrical energy in batteries. Several examples of systems in which electrical energy storage system 500 can be implemented are described in detail in U.S. Provisional Patent Applications Nos. 62/239,131, 62/239,231, 62/239,233, 62/239,245, 62/239,246, and 62/239,249. All of these applications have a filing date of Oct. 8, 2015, and are incorporated by reference herein.

Electrical energy storage system 500 is shown to include a battery container 510. Battery container 510 may be an insulated or closed container which contains one or more batteries. In some embodiments, battery container 510 contains multiple battery strings 512, 514, and 516. Although only three battery strings are shown in FIG. 5, it should be understood that battery container 510 can contain any number of battery strings. Battery strings 512-516 can be arranged in parallel with one another and connected to a battery power inverter 504.

Each battery string 512-516 can include one or more batteries 513, 515 and 517. In some embodiments, batteries 513-517 are nickel-cobalt-aluminum (NCA) lithium ion (Li-Ion) batteries. For example, batteries 513-517 can be model VL41M NCA Li-Ion batteries. Each battery 513-517 can include one or more battery cells or battery modules. Although only six batteries 513-517 are shown in each battery string 512-516, it should be understood that each battery string 512-516 can include any number of batteries 513-517. Batteries 513-517 can be connected in series with one another within each battery string 512-516 to achieve the desired voltage per battery string 512-516.

Battery power inverter 504 can be the same or similar to power inverter 106 described with reference to FIG. 1 and/or battery power inverter 308 described with reference to FIG. 3. Battery power inverter 504 can be configured to charge or discharge each battery string 512-516 by controlling the electric current of each battery string 512-516. For example, battery power inverter 504 can draw power from battery string 512 by drawing a DC current $i_{string,1}$ from the positive terminal of battery string 512, and can store power in battery string 512 by causing the DC current $i_{string,1}$ to flow into the positive terminal of battery string 512.

Similarly, battery power inverter 504 can draw power from battery string 514 by drawing a DC current $i_{string,2}$ from the positive terminal of battery string 514, and can store power in battery string 514 by causing the DC current $i_{string,2}$ to flow into the positive terminal of battery string 514. Battery power inverter 504 can draw power from battery string 516 by drawing a DC current $i_{string,N}$ from the positive terminal of battery string 516, and can store power in battery string 516 by causing the DC current $i_{string,N}$ to flow into the positive terminal of battery string 516. Battery power inverter 504 can be configured to control and/or measure the magnitude of the DC currents through each battery string 512-516.

In some embodiments, battery strings 512-516 are connected to battery power inverter 504 via switches 507-509. For example, switches 507 are shown connecting battery string 512 to battery power inverter 504. Similarly, switches 508 are shown connecting battery string 514 to battery power inverter 504. Switches 509 are shown connecting battery string 516 to battery power inverter 504. Switches 507-509 can be implemented using physical switches (i.e., switches configured to physically open and close) or using any of a variety of electronic circuit components (e.g., transistors) configured to function as electronic switches. In some embodiments, battery power inverter 504 can operate switches 507-509 to connect and disconnect each of battery strings 512-516 (e.g., in response to a control signal from controller 502). In other embodiments, switches 507-509 can be operated directly by controller 502.

In some embodiments, battery power inverter 504 is configured to measure an open circuit voltage (OCV) of each battery string 512-516. The OCV of a battery string is the voltage across the positive and negative terminals of the battery string when the battery string is disconnected. The OCV of each battery string 512-516 can be measured using one or more voltage sensors connected to the positive and negative terminals of the battery strings 512-516. Battery power inverter 504 can measure the OCV of battery string 512 by opening switches 507 and measuring the voltage across the positive and negative terminals of battery string 512. Similarly, battery power inverter 504 can measure the OCV of battery string 514 by opening switches 508 and measuring the voltage across the positive and negative terminals of battery string 514. Battery power inverter 504 can measure the OCV of battery string 516 by opening switches 509 and measuring the voltage across the positive and negative terminals of battery string 516.

In some embodiments, battery power inverter 504 provides the OCV measurements to controller 502. In other embodiments, controller 502 receives the OCV measurements directly from one or more voltage sensors connected to battery strings 512-516. Controller 502 can operate switches 507-509 to connect and disconnect each of battery strings 512-516. After a battery string has been disconnected (e.g., by opening the corresponding switch), controller 502 can measure the OCV of the battery string using a voltage sensor connected to the positive and negative terminals of the battery string.

In some embodiments, electrical energy storage system 500 includes a temperature sensor 506 configured to measure the temperature of battery container 510. In some embodiments, system 500 includes multiple temperature sensors. Each temperature sensor can be configured to measure the temperature of a particular battery string 512-516, a particular battery 513-517, and/or the temperature of the air within battery container 510. The temperature sensors provide temperature measurements to controller 502. Controller 502 can use the temperature measurements in combination with the OCV measurements to estimate the state-of-charge of batteries 513-517 and/or an uncertainty in the state-of-charge of batteries 513-517 (described in greater detail below).

Still referring to FIG. 5, electrical energy storage system 500 is shown to include a controller 502. Controller 502 can be configured to monitor and control system 500. For example, controller 502 can receive temperature measurements from one or more temperature sensors 506 located within battery container 510. Controller 502 can receive OCV measurements from battery power inverter 504 and/or voltage sensors connected to the terminals of each battery string 512-516. Controller 502 and can provide control signals to battery power inverter 504. Controller 502 can operate battery power inverter 504 to control the rate at which electrical energy is stored or discharged from each of battery strings 512-516. Controller 502 can be configured to perform any of the functions described in U.S. Provisional Patent Applications Nos. 62/239,131, 62/239,231, 62/239,233, 62/239,245, 62/239,246, and 62/239,249. For example, controller 502 can operate battery power inverter 504 to perform frequency regulation, ramp rate control, electric load shifting, or any other activity which uses electrical energy storage.

Controller 502 can be configured to estimate the state-of-charge (SOC) of each battery string 512-516. In some embodiments, controller 502 estimates the SOC of battery strings 512-516 based on the OCV measurements. The relationship between the SOC of a battery string and the OCV of the battery string can be a function of various battery parameters which are known to controller 502 (e.g., battery capacity, battery design voltage, battery type, number of batteries in each string, etc.). In some embodiments, controller 502 stores a lookup table or mapping function which defines the relationship between SOC and OCV for each of battery strings 512-516. Controller 502 can use the stored lookup table or mapping function to calculate the SOC of each battery string 512-516 as a function of the OCV measurement for the battery string 512-516.

Controller 502 can accurately determine the SOC of each battery string 512-516 at the time the OCV of the battery string is measured based on the measured OCV. These SOC values are referred to herein as $SOC_0$, where the subscript zero indicates that the SOC value is obtained directly from an OCV measurement. However, the SOC of each battery string 512-516 can change after the battery string 512-516 is reconnected (e.g., by closing switches 507-509) and the batteries 513-517 are charged or discharged. Storing energy in batteries 513-517 can increase the SOC, whereas discharging energy from batteries 513-517 can decrease the state of charge.

In some embodiments, controller 502 estimates the SOC of each battery string 512-516 during operation (e.g., while switches 507-509 are closed) by tracking the battery power setpoints. For example, controller 502 can estimate an amount by which the SOC of a battery string 512-516 increases or decreases as a function of the battery power setpoints provided to battery power inverter 504. These changes in SOC are referred to herein as $\Delta SOC$ values. In some embodiments, controller 502 calculates a $\Delta SOC$ value by multiplying the battery power setpoint (e.g., units of power) by the duration over which the battery power setpoint is applied (e.g., units of time) to determine a change in the amount of energy stored in each battery string 512-516. In some embodiments, controller 502 calculates a ΔSOC value by multiplying the battery string currents (e.g., units of Amperes) by the duration over which the battery string current is applied (e.g., units of time) to determine a change in electric charge of each battery string 512-516.

Controller 502 can add the amount of the increase to a previously determined SOC value or subtract the amount of the decrease from the previously determined SOC value to estimate a new SOC of each battery string 512-516. For example, controller 502 can add the initial SOC value $SOC_0$ based on the OCV measurement to a $\Delta SOC_1$ value based on the power setpoints to calculate a new SOC value $SOC_1$ (e.g., $SOC_1 = SOC_0 + \Delta SOC_0$). At each time step, controller 502 can add or subtract a ΔSOC value from the previously determined SOC value (e.g., $SOC_0$, $SOC_1$, etc.) to account for the energy stored or discharged from the battery string 512-516 during that time step based on the battery power setpoints. Each time the SOC value is updated, the subscript can be incremented by one (e.g., $SOC_2 = SOC_1 + \Delta SOC_1$, $SOC_3 = SOC_2 + \Delta SOC_2$ etc.). The SOC values can be updated iteratively each time energy is stored in battery strings 512-516 or discharged from battery strings 512-516 by adding or subtracting a ΔSOC value based on the amount of energy added or discharged.

In some embodiments, controller 502 estimates an uncertainty in the SOC values. Each of the SOC values can have an uncertainty associated therewith. The uncertainty in the SOC values can increase over time as more ΔSOC values are added or subtracted from the initial SOC values $SOC_0$. The increase in uncertainty can result from the uncertainty associated with each ΔSOC value. As more ΔSOC values are added or subtracted from the initial SOC value $SOC_0$, the uncertainty in the new SOC value increases. In some embodiments, controller 502 uses the estimated SOC to determine optimal values for the battery power setpoints (as described in the aforementioned patent applications). Accordingly, in may be desirable to maintain the accuracy of the SOC values within a predetermined threshold (e.g., +/−10% accuracy) to ensure that controller 502 makes control decisions based on accurate SOC information.

In some embodiments, controller 502 compares the uncertainty in the SOC values to an uncertainty threshold. The uncertainty threshold can be defined as a percentage of the SOC, a percentage of the battery capacity, a fixed SOC amount, or any other threshold. In response to a determination that the uncertainty in the SOC for a battery string 512-516 exceeds the uncertainty threshold, controller 502 can automatically schedule the battery string to be disconnected so that the OCV of the battery string can be measured. After the battery string 512-516 has been disconnected, controller 502 can obtain an OCV measurement. Controller 502 can then use the new OCV measurement to determine a new initial SOC value $SOC_0$ for the battery string.

In some embodiments, controller 502 schedules a time at which the battery string 512-516 will be disconnected for an OCV measurement based on a predicted value of a frequency regulation signal (e.g., regulation signal 202). As described above, the regulation signal can be received from an energy utility and can be used to determine an amount of power to store or discharge in battery strings 512-516. Controller 502 can predict the value of the regulation signal based on past regulation signal statistics (described in greater detail below). Controller 502 can use the predicted values of the regulation signal to determine an optimal time at which to disconnect a battery string 512-516 such that the disturbance to frequency response operations are minimized. For example, controller 502 can select a time at which the regulation signal is predicted to be near zero so that disconnecting the battery string 512-516 will not significantly affect potential frequency response revenue. These and other features of controller 502 are described in greater detail below.

Controller

Figure 6:
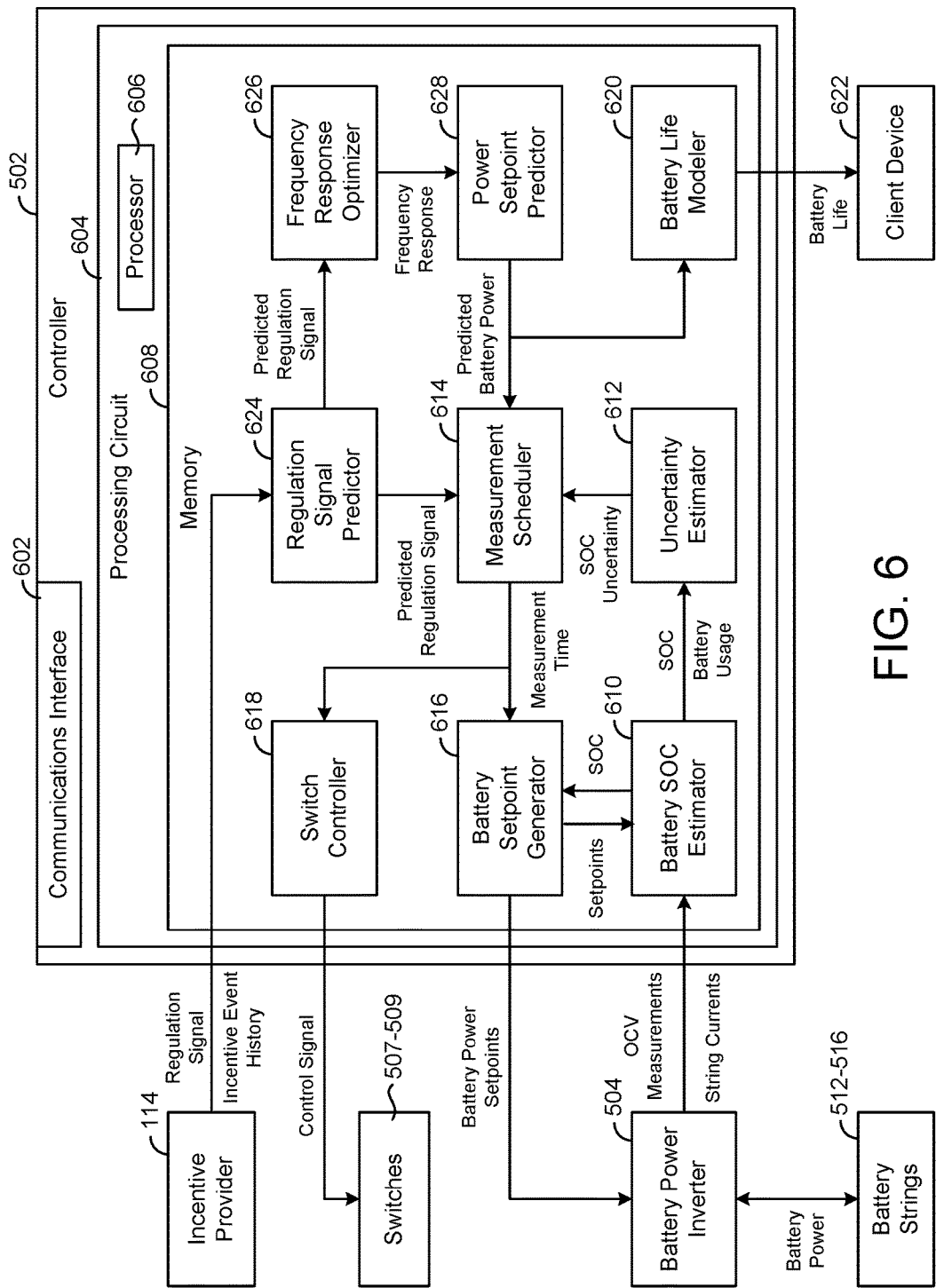
FIG. 6 is a block diagram illustrating a controller which can be used to control the electrical energy storage system of FIG. 5, according to an exemplary embodiment.

Referring now to FIG. 6, a block diagram illustrating controller 502 in greater detail is shown, according to an exemplary embodiment. Controller 502 is shown to include a communications interface 602 and a processing circuit 604. Communications interface 602 may include wired or wireless interfaces (e.g., jacks, antennas, transmitters, receivers, transceivers, wire terminals, etc.) for conducting data communications with various systems, devices, or networks. For example, communications interface 602 may include an Ethernet card and port for sending and receiving data via an Ethernet-based communications network and/or a WiFi transceiver for communicating via a wireless communications network. Communications interface 602 may be configured to communicate via local area networks or wide area networks (e.g., the Internet, a building WAN, etc.) and may use a variety of communications protocols (e.g., BACnet, IP, LON, etc.).

Communications interface 602 may be a network interface configured to facilitate electronic data communications between controller 502 and various external systems or devices (e.g., campus 102, energy grid 104, battery power inverter 504, incentive provider 114, client device 622, etc.). For example, controller 502 can receive voltage measurements (e.g., OCV measurements) and electric current measurements from battery power inverter 504 via communications interface 602. Controller 502 can receive temperature measurements from one or more temperature sensors 506 within battery container 510 via communications interface 602. Controller 502 can use communications interface 602 to send control signals to battery power inverter 504 (e.g., battery power setpoints) and/or switches 507-508 (e.g., open/close commands). In some embodiments, controller 502 provides fault indications and battery life indications to client device 622 via communications interface 602.

Processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 may be configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 604 and may include computer code for executing (e.g., by processor 606) one or more processes described herein.

Still referring to FIG. 6, controller 502 is shown to include a battery state-of-charge (SOC) estimator 610. Battery SOC estimator 610 is shown receiving the OCV measurements from battery power inverter 504. Battery SOC estimator can estimate the SOC of battery strings 512-516 based on the OCV measurements. As described above, the relationship between the SOC of a battery string and the OCV of the battery string can be a function of various battery parameters which are known to battery SOC estimator 610 (e.g., battery capacity, battery design voltage, battery type, number of batteries in each string, etc.). In some embodiments, battery SOC estimator 610 stores a lookup table or mapping function which defines the relationship between SOC and OCV for each of battery strings 512-516. Battery SOC estimator 610 can use the stored lookup table or mapping function to calculate the SOC of each battery string 512-516 as a function of the OCV measurement for the battery string 512-516.

Battery SOC estimator 610 can accurately determine the initial SOC (i.e., $SOC_0$) of each battery string 512-516 at the time the OCV of the battery string is measured based on the measured OCV. Battery SOC estimator 610 can also estimate the SOC of each battery string 512-516 during operation (e.g., while switches 507-509 are closed) by tracking the battery power setpoints and/or the battery string currents. For example, battery SOC estimator 610 can estimate an amount by which the SOC of a battery string 512-516 increases or decreases (i.e., $\Delta SOC$) as a function of the battery power setpoints provided to battery power inverter 504. In some embodiments, battery SOC estimator 610 calculates a $\Delta SOC$ value by multiplying the battery power setpoint (e.g., units of power) by the duration over which the battery power setpoint is applied (e.g., units of time) to determine a change in the amount of energy stored in each battery string 512-516. In some embodiments, battery SOC estimator 610 calculates a $\Delta SOC$ value by multiplying the battery string currents (e.g., units of Amperes) by the duration over which the battery string current is applied (e.g., units of time) to determine a change in electric charge of each battery string 512-516.

Battery SOC estimator 610 can add the amount of the increase to a previously determined SOC value or subtract the amount of the decrease from the previously determined SOC value to estimate a new SOC of each battery string 512-516. For example, battery SOC estimator 610 can add the initial SOC value $SOC_0$ based on the OCV measurement to a $\Delta SOC_1$ value based on the power setpoints to calculate a new SOC value $SOC_1$ (e.g., $SOC_1 = SOC_0 + \Delta SOC_0$). At each time step, battery SOC estimator 610 can add or subtract a $\Delta SOC$ value from the previously determined SOC value (e.g., $SOC_0$, $SOC_1$, etc.) to account for the energy stored or discharged from the battery string 512-516 during that time step based on the battery power setpoints. Each time the SOC value is updated, the subscript can be incremented by one (e.g., $SOC_2 = SOC_1 + \Delta SOC_1$, $SOC_3 = SOC_2 + \Delta SOC_2$, etc.). Battery SOC estimator 610 can update the SOC values iteratively each time energy is stored in battery strings 512-516 or discharged from battery strings 512-516 by adding or subtracting a $\Delta SOC$ value based on the amount of energy added or discharged.

In some embodiments, battery SOC estimator 610 provides the battery SOC estimates to battery setpoint generator 616. Battery setpoint generator 616 can use the estimated SOC values to generate battery power setpoints. For example, battery setpoint generator 616 can use the estimated SOC values to determine an optimal amount of power to store in battery strings 512-516 and/or discharge from battery strings 512-516 at each time step during an optimization period. In some embodiments, battery setpoint generator 616 uses the estimated SOC values to formulate constraints on the power setpoint optimization. For example, battery setpoint generator 616 can ensure that the optimization procedure does not generate battery power setpoints that would cause the SOC of battery strings 512-516 to drop below zero or increase above maximum capacity. Several examples of optimization techniques which can be used by battery setpoint generator 616 to generate battery power setpoints are described in detail in U.S. Patent Application No. 62/239,233.

Still referring to FIG. 6, controller 502 is shown to include an uncertainty estimator 612. Uncertainty estimator 612 is shown receiving the SOC estimates from battery SOC estimator 610. Uncertainty estimator 612 can be configured to calculate an uncertainty in the estimated SOC values. In some embodiments, uncertainty estimator 612 estimates the uncertainty of the initial SOC values $SOC_0$ based on the uncertainty of the measured OCV (e.g., measurement uncertainty in the OCV measurements). The uncertainty in the SOC values can increase over time as more $\Delta SOC$ values are added or subtracted from the initial SOC values $SOC_0$ by battery SOC estimator 610. Uncertainty estimator 612 can adjust the uncertainty of the estimated SOC values to reflect the increase in uncertainty over time.

In some embodiments, uncertainty estimator 612 calculates an updated uncertainty value based on the uncertainty associated with each $\Delta SOC$ value added to the initial SOC estimate $SOC_0$. As more $\Delta SOC$ values are added or subtracted from the initial SOC value $SOC_0$, the uncertainty in the new SOC value increases. Uncertainty estimator 612 can use any of a variety of uncertainty propagation techniques to propagate the uncertainty of each $\Delta SOC$ value to the resultant uncertainty estimate (e.g., $SOC_1$, $SOC_2$, etc.).

In some embodiments, uncertainty estimator 612 estimates the uncertainty in the SOC values as a function of time. For example, the uncertainty of each SOC estimate can increase (e.g., linearly, nonlinearly, etc.) as a function of time elapsed since the most recent OCV measurement. Uncertainty estimator 612 can determine when the most recent OCV measurement occurred and can calculate an amount of time elapsed since the OCV measurement. Uncertainty estimator 612 can use the elapsed time to calculate an uncertainty in the SOC value.

In some embodiments, uncertainty estimator 612 estimates an uncertainty in the SOC values as a function of battery usage. For example, uncertainty estimator 612 is shown receiving battery usage data from battery SOC estimator 610. Battery usage data can include, for example, battery power setpoints, power throughout, battery string currents, depth of discharge, battery temperature, battery voltage, or any other variable or parameters that describe how batteries 513-517 are used during operation. The battery usage data can be generated by various components of controller 502 and/or measured by one or more sensors (e.g., temperature sensors, current sensors, voltage sensors, etc.). Uncertainty estimator 612 can provide the SOC uncertainty to measurement scheduler 614, battery life modeler 620, client device 622, or any other system or device.

Still referring to FIG. 6, controller 502 is shown to include a regulation signal predictor 624. Regulation signal predictor 624 can be configured to predict various attributes of the regulation signal provided by incentive provider 114. In some embodiments, regulation signal predictor 624 uses a deterministic plus stochastic model trained from historical regulation signal data to predict future values of the regulation signal. For example, regulation signal predictor 624 may use linear regression to predict a deterministic portion of the regulation signal and an autoregressive (AR) model to predict a stochastic portion of the regulation signal. In some embodiments, regulation signal predictor 624 predicts the regulation signal using the techniques described in U.S. patent application Ser. No. 14/717,593, titled "Building Management System for Forecasting Time Series Values of Building Variables" and filed May 20, 2015.

Regulation signal predictor 624 can use the predicted values of the regulation signal to calculate regulation signal statistics. For example, regulation signal predictor 624 can be configured to calculate the mean $\mu_{FR}$, standard deviation $\sigma_{FR}$, and/or other statistics of the regulation signal. The regulation signal statistics may be based on previous values of the regulation signal (e.g., a historical mean, a historical standard deviation, etc.) or predicted values of the regulation signal (e.g., a predicted mean, a predicted standard deviation, etc.).

In some embodiments, regulation signal predictor 624 is configured to predict the values of one or more variables that can be used to estimate frequency response revenue. For example, the frequency response revenue can be defined by the following equation:

$$Rev=PS(CP_{cap}+MR \cdot CP_{perf})Reg_{award}$$

where Rev is the frequency response revenue, $CP_{cap}$ is the capability clearing price, MR is the mileage ratio, and $CP_{perf}$ is the performance clearing price. PS is a performance score based on how closely the frequency response provided by controller 502 tracks the regulation signal. Regulation signal predictor 624 may be configured to predict the capability clearing price $CP_{cap}$, the performance clearing price $CP_{perf}$, the mileage ratio MR, and/or other energy market statistics that can be used to estimate frequency response revenue. Regulation signal predictor 624 can store the predicted regulation signal in memory 608 and/or provide the predicted regulation signal to other components of controller 502 (e.g., measurement scheduler 614, frequency response optimizer 626, etc.).

Still referring to FIG. 6, controller 502 is shown to include a frequency response optimizer 626. Frequency response optimizer 626 can be configured to generate an optimal frequency response based on the predicted regulation signal. Frequency response optimizer 626 may be configured to generate values for the midpoint b and the capability bid $Reg_{award}$. In some embodiments, frequency response optimizer 626 determines a midpoint b that will cause battery strings 512-516 to have the same SOC at the beginning and end of each frequency response period. In other embodiments, frequency response optimizer 626 performs an optimization process to generate midpoint b and $Reg_{award}$. For example, frequency response optimizer 626 may generate midpoint b using an optimization procedure that allows the SOC of battery strings 512-516 to vary and/or have different values at the beginning and end of the frequency response period. Frequency response optimizer 626 may use the SOC of battery strings 512-516 as a constrained variable that depends on midpoint b in order to optimize a value function that takes into account frequency response revenue, energy costs, and the cost of battery degradation.

Frequency response optimizer 626 may determine midpoint b by equating the desired power $P_{POI}^*$ at POI 110 with the actual power at POI 110 as shown in the following equation:

$$(Reg_{signal})(Reg_{award})+b=P_{bat}+P_{loss}+P_{campus}$$

where the left side of the equation $(Reg_{signal})(Reg_{award})$ b is the desired power $P_{POI}^*$ at POI 110 and the right side of the equation is the actual power at POI 110. Integrating over the frequency response period results in the following equation:

$$\int_{period} ((Reg_{signal})(Reg_{award}) + b)dt = \int_{period} (P_{bat} + P_{loss} + P_{campus})dt$$

For embodiments in which the SOC of battery strings 512-516 is maintained at the same value at the beginning and end of the frequency response period, the integral of the battery power $P_{bat}$ over the frequency response period is zero (i.e., $\int P_{bat}dt=0$). Accordingly, the previous equation can be rewritten as follows:

$$b = \int_{period} P_{loss}dt + \int_{period} P_{campus}dt - Reg_{award}\int_{period} Reg_{signal}dt$$

where the term $\int P_{bat}dt$ has been omitted because $\int P_{bat}dt=0$. This is ideal behavior if the only goal is to maximize frequency response revenue. Keeping the SOC of battery strings 512-516 at a constant value (and near 50%) will enable participation in the frequency market during all hours of the day.

Frequency response optimizer 626 may use estimated values of a campus power signal received from campus 102 to predict the value of $\int P_{campus}dt$ over the frequency response period. Similarly, frequency response optimizer 626 may use the estimated values of the regulation signal from incentive provider 114 to predict the value of $\int Reg_{signal}dt$ over the frequency response period. Frequency response optimizer 626 may estimate the value of $\int P_{loss}dt$ using a Thevinin equivalent circuit model of battery strings 512-516. This allows frequency response optimizer 626 to estimate the integral $\int P_{loss}dt$ as a function of other variables such as $Reg_{award}$, $Reg_{signal}$, $P_{campus}$, and midpoint b.

After substituting known and estimated values, the preceding equation can be rewritten as follows:

$$\frac{1}{4P_{max}}[E\{P_{campus}^2\} + Reg_{award}^2 E\{Reg_{signal}^2\} -$$
$$2Reg_{award}E\{Reg_{signal}\}E\{P_{campus}\}]\Delta t +$$
$$[Reg_{award}E\{Reg_{signal}\} - E\{P_{campus}\}]\Delta t +$$
$$\frac{b}{2P_{max}}[Reg_{award}E\{Reg_{signal}\} - E\{P_{campus}\}]\Delta t + b\Delta t + \frac{b^2}{4P_{max}}\Delta t = 0$$

where the notation Et{ } indicates that the variable within the brackets { } is ergodic and can be approximated by the estimated mean of the variable. For example, the term $E\{Reg_{signal}\}$ can be approximated by the estimated mean of the regulation signal $\mu_{FR}$ and the term $E\{P_{campus}\}$ can be approximated by the estimated mean of the campus power signal $\mu_{campus}$. Frequency response optimizer 626 may solve the equation for midpoint b to determine the midpoint b that maintains battery strings 512-516 at a constant state-of-charge.

For embodiments in which the SOC of battery strings 512-516 is treated as a variable, the SOC of battery strings 512-516 may be allowed to have different values at the beginning and end of the frequency response period. Accordingly, the integral of the battery power $P_{bat}$ over the frequency response period can be expressed as $-\Delta SOC \cdot C_{des}$ as shown in the following equation:

$$\int_{period} P_{bat} dt = -\Delta SOC \cdot C_{des}$$

where $\Delta SOC$ is the change in the SOC of over the frequency response period and $C_{des}$ is the design capacity of battery strings 512-516. The SOC of battery strings 512-516 may be a normalized variable (i.e., $0 \leq SOC \leq 1$) such that the term $SOC \cdot C_{des}$ represents the amount of energy stored in battery strings 512-516 for a given state-of-charge. The SOC is shown as a negative value because drawing energy from battery strings 512-516 (i.e., a positive $P_{bat}$) decreases the SOC of battery strings 512-516. The equation for midpoint b becomes:

$$b = \int_{period} P_{loss} dt + \int_{period} P_{campus} dt + \int_{period} P_{bat} dt - Reg_{award} \int_{period} Reg_{signal} dt$$

After substituting known and estimated values, the preceding equation can be rewritten as follows:

$$\frac{1}{4P_{max}} [E\{P_{campus}^2\} + Reg_{award}^2 + E\{Reg_{signal}^2\} - 2Reg_{award} E\{Reg_{signal}\} E\{P_{campus}\}] \Delta t +$$
$$[Reg_{award} E\{Reg_{signal}\} + E\{P_{campus}\}] \Delta t + \Delta SOC \cdot C_{des} +$$
$$\frac{b}{2P_{max}} [Reg_{award} E\{Reg_{signal}\} - E\{P_{campus}\}] \Delta t + b\Delta t + \frac{b^2}{4P_{max}} \Delta t = 0$$

Frequency response optimizer 626 may solve the equation for midpoint b in terms of $\Delta SOC$.

Frequency response optimizer 626 may perform an optimization to find optimal midpoints b for each frequency response period within an optimization window (e.g., each hour for the next day) given the electrical costs over the optimization window. Optimal midpoints b may be the midpoints that maximize an objective function that includes both frequency response revenue and costs of electricity and battery degradation. For example, an objective function J can be written as:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where $Rev(Reg_{award,k})$ is the frequency response revenue at time step k, $c_k b_k$ is the cost of electricity purchased at time step k, the min( ) term is the demand charge based on the maximum rate of electricity consumption during the applicable demand charge period, and $\lambda_{bat,k}$ is the monetized cost battery degradation at time step k. The electricity cost is expressed as a positive value because drawing power from energy grid 104 is represented as a negative power and therefore will result in negative value (i.e., a cost) in the objective function. The demand charge is expressed as a minimum for the same reason (i.e., the most negative power value represents maximum power draw from energy grid 104).

Frequency response optimizer 626 may estimate the frequency response revenue $Rev(Reg_{award,k})$ as a function of the midpoints b. In some embodiments, frequency response optimizer 626 estimates frequency response revenue using the following equation:

$$Rev(Reg_{award}) = Reg_{award}(CP_{cap} + MR \cdot CP_{perf})$$

where $CP_{cap}$, MR, and $CP_{perf}$ are the energy market statistics received from regulation signal predictor 624 and $Reg_{award}$ is a function of the midpoint b. For example, frequency response optimizer 626 may place a bid that is as large as possible for a given midpoint, as shown in the following equation:

$$Reg_{award} = P_{limit} - |b|$$

where $P_{limit}$ is the power rating of power inverter 504. Advantageously, selecting $Reg_{award}$ as a function of midpoint b allows frequency response optimizer 626 to predict the frequency response revenue that will result from a given midpoint b.

Frequency response optimizer 626 may estimate the cost of battery degradation $\lambda_{bat}$ as a function of the midpoints b. For example, frequency response optimizer 626 may use a battery life model (provided by battery life modeler 620) to predict a loss in battery capacity that will result from a set of midpoints b, power outputs, and/or other variables that can be manipulated by controller 502. In some embodiments, the battery life model expresses the loss in battery capacity $C_{loss,add}$ as a sum of multiple piecewise linear functions, as shown in the following equation:

$$C_{loss,add} = f_1(T_{cell}) + f_2(SOC) + f_3(DOD) + f_4(PR) + f_5(ER) - C_{loss,nom}$$

where $T_{cell}$ is the cell temperature, SOC is the state-of-charge, DOD is the depth of discharge, PR is the average power ratio $$\left( e.g., PR = avg\left(\frac{P}{P_{des}}\right) \right),$$

and ER is the average effort ratio $$\left( e.g., ER = avg\left(\frac{\Delta P}{P_{des}}\right) \right)$$

of battery strings 512-516. Advantageously, several of the terms in the battery life model depend on the midpoints b and power setpoints selected by controller 502. This allows frequency response optimizer 626 to predict a loss in battery capacity that will result from a given set of control outputs. Frequency response optimizer 626 may monetize the loss in battery capacity and include the monetized cost of battery degradation $\lambda_{bat}$ in the objective function J.

In some embodiments, frequency response optimizer 626 determines the optimal frequency response $Res_{FR}$ by optimizing value function J with the frequency response revenue Rev(Reg$_{award}$) defined as follows:

$$\text{Rev}(\text{Reg}_{award}) = \text{PS} \cdot \text{Reg}_{award}(\text{CP}_{cap} + \text{MR} \cdot \text{CP}_{perf})$$

and with the frequency response Res$_{FR}$ substituted for the regulation signal in the battery life model. The performance score PS may be based on several factors that indicate how well the optimal frequency response Res$_{FR}$ tracks the regulation signal. Closely tracking the regulation signal may result in higher performance scores, thereby increasing the frequency response revenue. However, closely tracking the regulation signal may also increase the cost of battery degradation $\lambda_{bat}$. The optimized frequency response Res$_{FR}$ represents an optimal tradeoff between decreased frequency response revenue and increased battery life.

In some embodiments, frequency response optimizer 626 generates a capability bid Reg$_{award}$ based on the midpoint b. In some embodiments, frequency response optimizer 626 generates a capability bid that is as large as possible for a given midpoint, as shown in the following equation:

$$\text{Reg}_{award} = P_{limit} - |b|$$

where $P_{limit}$ is the power rating of power inverter 504. Frequency response optimizer 626 may provide the capability bid to incentive provider. Frequency response optimizer 626 may perform an optimization process to determine the optimal frequency response Res$_{FR}$ based on the values for Reg$_{award}$ and midpoint b. In the optimization, the values for Reg$_{award}$ and midpoint b may be fixed at the values previously determined.

In some embodiments, frequency response optimizer 626 determines the optimal frequency response Res$_{FR}$ by optimizing value function J shown in the following equation:

$$J = \sum_{k=1}^{h} \text{Rev}(\text{Reg}_{award,k}) + \sum_{k=1}^{h} c_k b_k + \min_{period}(P_{campus,k} + b_k) - \sum_{k=1}^{h} \lambda_{bat,k}$$

where the frequency response revenue Rev(Reg$_{award}$) is defined as follows:

$$\text{Rev}(\text{Reg}_{award}) = \text{PS} \cdot \text{Reg}_{award}(\text{CP}_{cap} + \text{MR} \cdot \text{CP}_{perf})$$

and the frequency response Res$_{FR}$ is substituted for the regulation signal Reg$_{signal}$ in the battery life model used to calculate $\lambda_{bat,k}$. The performance score PS may be based on several factors that indicate how well the optimal frequency response Res$_{FR}$ tracks the regulation signal Reg$_{signal}$.

The frequency response Res$_{FR}$ may affect both Rev(Reg$_{award}$) and the monetized cost of battery degradation $\lambda_{bat}$. Closely tracking the regulation signal may result in higher performance scores, thereby increasing the frequency response revenue. However, closely tracking the regulation signal may also increase the cost of battery degradation $\lambda_{bat}$. The optimized frequency response Res$_{FR}$ represents an optimal tradeoff between decreased frequency response revenue and increased battery life (i.e., the frequency response that maximizes value J).

In some embodiments, the performance score PS is a composite weighting of an accuracy score, a delay score, and a precision score. Frequency response optimizer 626 may calculate the performance score PS using the performance score model shown in the following equation:

$$PS = \frac{1}{3} PS_{acc} + \frac{1}{3} PS_{delay} + \frac{1}{3} PS_{prec}$$

where PS$_{acc}$ is the accuracy score, PS$_{delay}$ is the delay score, and PS$_{prec}$ is the precision score. In some embodiments, each term in the precision score is assigned an equal weighting (e.g., ⅓). In other embodiments, some terms may be weighted higher than others.

The accuracy score PS$_{acc}$ may be the maximum correlation between the regulation signal Reg$_{signal}$ and the optimal frequency response Res$_{FR}$. Frequency response optimizer 626 may calculate the accuracy score PS$_{acc}$ using the following equation:

$$PS_{acc} = \max_{\delta} r_{Reg,Res(\delta)}$$

where $\delta$ is a time delay between zero and $\delta_{max}$ (e.g., between zero and five minutes).

The delay score PS$_{delay}$ may be based on the time delay $\delta$ between the regulation signal Reg$_{signal}$ and the optimal frequency response Res$_{FR}$. Frequency response optimizer 626 may calculate the delay score PS$_{delay}$ using the following equation:

$$PS_{delay} = \left| \frac{\delta[s] - \delta_{max}}{\delta_{max}} \right|$$

where $\delta[s]$ is the time delay of the frequency response Res$_{FR}$ relative to the regulation signal Reg$_{signal}$ and is the maximum allowable delay (e.g., 5 minutes or 300 seconds).

The precision score PS$_{prec}$ may be based on a difference between the frequency response Res$_{FR}$ and the regulation signal Reg$_{signal}$. Frequency response optimizer 626 may calculate the precision score PS$_{prec}$ using the following equation:

$$PS_{prec} = 1 - \frac{\sum |Res_{FR} - Reg_{signal}|}{\sum |Reg_{signal}|}$$

Frequency response optimizer 626 may use the estimated performance score and the estimated battery degradation to define the terms in objective function J. Frequency response optimizer 626 may determine values for frequency response Res$_{FR}$ that optimize objective function J. In various embodiments, frequency response optimizer 626 may use sequential quadratic programming, dynamic programming, or any other optimization technique. These and other features which can be included in frequency response optimizer 626 are described in detail in U.S. Patent Application No. 62/239,233.

Still referring to FIG. 6, controller 502 is shown to include a power setpoint predictor 628. Power setpoint predictor 628 can be configured to predict future power setpoints for battery power inverter 504 based on the optimal frequency response generated by frequency response optimizer 626. For example, power setpoint predictor 628 may use the optimal frequency response to calculate the desired interconnection power P$_{POI}$* using the following equation:

$$P_{POI}^* = \text{Reg}_{award} \cdot \text{Reg}_{filter} + b$$

where Reg$_{filter}$ is the filtered regulation signal. Power setpoint predictor 628 may subtract the campus power P$_{campus}$ from the desired interconnection power P$_{POI}$ to calculate the optimal power setpoints $P_{SP}$ for power inverter 504, as shown in the following equation:

$$P_{SP} = P_{POI}^* - P_{campus}$$

Power setpoint predictor 628 can generate predicted power setpoints for battery power inverter for a plurality of time steps in an optimization period.

Still referring to FIG. 6, controller 502 is shown to include a measurement scheduler 614. Measurement scheduler 614 can be configured to determine a time at which to disconnect one or more of battery strings 512-516 so that the OCV of the battery string can be measured. In some embodiments, measurement scheduler 614 schedules an OCV measurement in response to a determination that the SOC uncertainty is greater than a threshold value. For example, measurement scheduler 614 can monitor the SOC uncertainty provided by uncertainty estimator 612 and compare the SOC uncertainty to an uncertainty threshold. The uncertainty threshold can be defined as a percentage of the SOC, a percentage of the battery capacity, a fixed SOC amount, or any other threshold. In response to a determination that the uncertainty in the SOC for a battery string 512-516 exceeds the uncertainty threshold, measurement scheduler 614 can automatically schedule the battery string to be disconnected so that the OCV of the battery string can be measured.

In some embodiments, measurement scheduler 614 schedules the OCV measurement based on the predicted regulation signal and/or the predicted battery power setpoints. For example, measurement scheduler 614 can identify a time at which the regulation signal and/or battery power setpoint is predicted to be near zero (or at a minimum) based on the predictions received from regulation signal predictor 626 and/or power setpoint predictor 628. Measurement scheduler 614 can schedule the OCV measurement at the selected time so that disconnecting the battery string 512-516 will not significantly affect potential frequency response revenue. Measurement scheduler 614 can provide the measurement time to battery setpoint generator 616 and switch controller 618.

Switch controller 618 can be configured to operate switches 507-509. For example, switch controller 618 can cause one or more of switches 507-509 to open at the measurement time so that the OCV of the corresponding battery string 512-516 can be measured. Switch controller 618 can cause one or more of battery strings 512-516 to be disconnected by opening the corresponding switch 507-509. After the battery string 512-516 has been disconnected, controller 502 can obtain an OCV measurement. Battery SOC estimator 610 can then use the new OCV measurement to determine a new initial SOC value $SOC_0$ for the battery string. This process can be repeated whenever the uncertainty in the SOC value exceeds the uncertainty threshold to ensure accuracy in the estimated SOC values.

As described above, battery setpoint generator 616 can use the estimated SOC values and the optimal frequency response to generate battery power setpoints. For example, battery setpoint generator 616 can use the estimated SOC values to determine an optimal amount of power to store in battery strings 512-516 and/or discharge from battery strings 512-516 at each time step during an optimization period. In some embodiments, battery setpoint generator 616 adjusts the optimal battery power setpoints to account for one or more of battery strings 512-516 being disconnected at the measurement time. For example, battery setpoint generator 616 can reduce the battery power setpoint for time steps during which one or more battery strings 512-516 will be disconnected.

Reducing the battery power setpoint while one or more of battery strings 512-516 is disconnected has several advantages. For example, such a reduction in the battery power setpoint can prevent a large change in the SOC of the connected battery strings 512-516 while one or more of the battery strings 512-516 is disconnected. This helps reduce the difference in SOC between the connected and disconnected battery strings 512-516 when the disconnected battery string is subsequently reconnected. Additionally, maintaining the battery strings 512-516 at similar SOC values can limit the potential for electric arcing or fusing of the battery electrical connectors when the disconnected battery string is reconnected.

Still referring to FIG. 6, controller 502 is shown to include a battery life modeler 620. Battery life modeler 620 can be configured to estimate the remaining life of batteries 513-517 based on the OCV measurements and other battery data. In some embodiments, battery life modeler 620 estimates remaining battery life using a battery life model. The battery life model can define remaining battery life as a function of various battery parameters such as the measured OCV, the time to reach the OCV, battery throughput, depth of discharge, average SOC, battery power setpoints, battery cell resistance $R_{cell}$, and/or the operating parameters available to controller 502. One example of such a battery life model is shown in the following equation:

$$BatteryLife = f\left(R_{cell}, t_{OCV}, DOD, SOC, \sum kW_{battery}, \sum \frac{dkW_{battery}}{dt}\right)$$

where BatteryLife is the estimated remaining battery life, $R_{cell}$ is the battery cell resistance, $t_{OCV}$ is the time required for the battery to reach the OCV value, DOD is the typical (e.g., average) depth of discharge of the battery during use, SOC is the typical (e.g., average) state-of-charge of the battery, $kW_{battery}$ is the battery power setpoint, and $$\frac{dkW_{battery}}{dt}$$

is the rate or change of the battery power setpoint.

Some of the variables in the battery life model can be based on the battery power setpoints provided by battery setpoint generator 616 and/or other control decisions made by controller 502. Other variables in the battery life model can be based on the OCV measurements and/or other battery attributes or parameters. Several examples of battery life models which can be used by battery life modeler 620 are described in detail in U.S. Provisional Patent Applications Nos. 62/239,131 and 62/239,246. Battery life modeler 620 can provide the remaining battery life to client device 622.

Flow Diagrams

Referring now to FIG. 7, a flowchart of a process 700 for estimating the state-of-charge (SOC) of a battery in an electrical energy storage system is shown, according to an exemplary embodiment. Process 700 can be performed by one or more components of electrical energy storage system 500, as described with reference to FIGS. 5-6.

Process 700 is shown to include determining an uncertainty in an estimated SOC of a battery and comparing the uncertainty to a threshold value (step 702). In some embodiments, step 702 is performed by uncertainty estimator 612, as described with reference to FIG. 6. Step 702 can include estimating the uncertainty of an initial SOC value $SOC_0$ based on the uncertainty of a measured OCV (e.g., measurement uncertainty in the OCV measurements). The uncertainty in the SOC values can increase over time as more ΔSOC values are added or subtracted from the initial SOC values $SOC_0$. Step 702 can include adjusting the uncertainty of the estimated SOC values to reflect the increase in uncertainty over time.

In some embodiments, step 702 includes calculating an updated uncertainty value based on the uncertainty associated with each ΔSOC value added to the initial SOC estimate $SOC_0$. As more ΔSOC values are added or subtracted from the initial SOC value $SOC_0$, the uncertainty in the new SOC value increases. Step 702 can include using any of a variety of uncertainty propagation techniques to propagate the uncertainty of each ΔSOC value to the resultant uncertainty estimate (e.g., $SOC_1$, $SOC_2$, etc.).

In some embodiments, step 702 includes estimating the uncertainty in the SOC values as a function of time. For example, the uncertainty of each SOC estimate can increase (e.g., linearly, nonlinearly, etc.) as a function of time elapsed since the most recent OCV measurement. Step 702 can include determining when the most recent OCV measurement occurred, calculating an amount of time elapsed since the OCV measurement, and using the elapsed time to calculate an uncertainty in the SOC value.

In some embodiments, step 702 includes estimating an uncertainty in the SOC values as a function of battery usage. For example, step 702 can include receiving battery usage data describing the usage of the battery. Battery usage data can include, for example, battery power setpoints, power throughout, battery string currents, depth of discharge, battery temperature, battery voltage, or any other variable or parameters that describe how the battery is used during operation. The battery usage data can be generated by various components of controller 502 and/or measured by one or more sensors (e.g., temperature sensors, current sensors, voltage sensors, etc.).

Process 700 is shown to include scheduling a time at which to measure an open circuit voltage of the battery in response to the uncertainty exceeding a threshold value (step 704). In some embodiments, step 704 is performed by measurement scheduler 614, as described with reference to FIG. 6. Step 704 can include monitoring the SOC uncertainty determined in step 702 and comparing the SOC uncertainty to an uncertainty threshold. The uncertainty threshold can be defined as a percentage of the SOC, a percentage of the battery capacity, a fixed SOC amount, or any other threshold. Step 704 can include automatically scheduling the battery string to be disconnected so that the OCV of the battery string can be measured in response to a determination that the uncertainty in the SOC exceeds the uncertainty threshold.

In some embodiments, step 704 includes scheduling the OCV measurement based on a predicted regulation signal and/or the predicted battery power setpoints. For example, step 704 can include identifying a time at which the regulation signal and/or battery power setpoint is predicted to be near zero (or at a minimum). The OCV measurement can be scheduled at the identified time so that disconnecting the battery will not significantly affect potential frequency response revenue.

Process 700 is shown to include disconnecting the battery and measuring the open circuit voltage at the scheduled time (step 706). In some embodiments, step 706 is performed by switch controller 618, as described with reference to FIG. 6. Step 706 can include operating one or more switches that connect the battery to the rest of the system such that the switches open at the measurement time and disconnect the battery. The OCV of the battery can then be measured while the battery is disconnected.

Process 700 is shown to include estimating the SOC of the battery based on the measured open circuit voltage (step 708). The relationship between the SOC of the battery and the OCV of the battery can be a function of various known battery parameters (e.g., battery capacity, battery design voltage, battery type, number of batteries in each string, etc.). In some embodiments, step 708 includes using a lookup table or mapping function which defines the relationship between SOC and OCV for the battery. The stored lookup table or mapping function can be used to calculate the SOC of the battery as a function of the OCV measurement obtained in step 706.

In some embodiments, step 708 include estimating the SOC of the battery during operation (e.g., while the switches are closed and the battery is being used for frequency regulation) by tracking the battery power setpoints and/or the battery string currents. For example, step 708 can include estimating an amount by which the SOC of the battery increases or decreases (i.e., ΔSOC) as a function of the battery power setpoints provided to battery power inverter 504. In some embodiments, step 708 includes calculating a ΔSOC value by multiplying the battery power setpoint (e.g., units of power) by the duration over which the battery power setpoint is applied (e.g., units of time) to determine a change in the amount of energy stored in each battery string 512-516. In some embodiments, step 708 includes calculating a ΔSOC value by multiplying the battery string currents (e.g., units of Amperes) by the duration over which the battery string current is applied (e.g., units of time) to determine a change in electric charge of the battery.

Step 708 can include adding the amount of the increase to a previously determined SOC value or subtract the amount of the decrease from the previously determined SOC value to estimate a new SOC of the battery. For example, step 708 can include adding the initial SOC value $SOC_0$ based on the OCV measurement to a $\Delta SOC_1$ value based on the power setpoints to calculate a new SOC value $SOC_1$ (e.g., $SOC_1 = SOC_0 + \Delta SOC_0$). At each time step, a ΔSOC value can be added or subtracted from the previously determined SOC value (e.g., $SOC_0$, $SOC_1$, etc.) to account for the energy stored or discharged from the battery during that time step based on the battery power setpoints. Step 708 can include updating the SOC values iteratively each time energy is stored in the battery or discharged from the battery by adding or subtracting a ΔSOC value based on the amount of energy added or discharged.

After the SOC of the battery has been estimated and/or updated in step 708, process 700 can return to step 702. Process 700 can be repeated whenever the uncertainty in the SOC value exceeds the uncertainty threshold to ensure accuracy in the estimated SOC values.

Referring now to FIG. 8, a flowchart of a process 800 for obtaining an open circuit voltage (OCV) of a battery in an electrical energy storage system is shown, according to an exemplary embodiment. Process 800 can be performed by one or more components of electrical energy storage system 500, as described with reference to FIGS. 5-6.

Process 700 is shown to include predicting future values of a frequency regulation signal (step 802). Step 802 can include predicting various attributes of the regulation signal provided by an incentive provider. In some embodiments, step 802 includes using a deterministic plus stochastic model trained from historical regulation signal data to predict future values of the regulation signal. For example, step 802 can include using linear regression to predict a deterministic portion of the regulation signal and an autoregressive (AR) model to predict a stochastic portion of the regulation signal. In some embodiments, step 802 includes predicting the regulation signal using the techniques described in U.S. patent application Ser. No. 14/717,593, titled "Building Management System for Forecasting Time Series Values of Building Variables" and filed May 20, 2015.

Step 802 can include using the predicted values of the regulation signal to calculate regulation signal statistics. For example, step 802 can include calculating the mean $\mu_{FR}$, standard deviation $\sigma_{FR}$, and/or other statistics of the regulation signal. The regulation signal statistics may be based on previous values of the regulation signal (e.g., a historical mean, a historical standard deviation, etc.) or predicted values of the regulation signal (e.g., a predicted mean, a predicted standard deviation, etc.).

In some embodiments, step 802 includes predicting the values of one or more variables that can be used to estimate frequency response revenue. For example, the frequency response revenue can be defined by the following equation:

$$Rev = PS(CP_{cap} + MR \cdot CP_{perf})Reg_{award}$$

where Rev is the frequency response revenue, $CP_{cap}$ is the capability clearing price, MR is the mileage ratio, and $CP_{perf}$ is the performance clearing price. PS is a performance score based on how closely the frequency response provided by controller 502 tracks the regulation signal. Step 802 can include predicting the capability clearing price $CP_{cap}$, the performance clearing price $CP_{perf}$, the mileage ratio MR, and/or other energy market statistics that can be used to estimate frequency response revenue.

Process 800 is shown to include scheduling a time at which to disconnect a battery of the electrical energy storage system based on the predicted frequency regulation signal (step 804). In some embodiments, step 804 is performed by measurement scheduler 614, as described with reference to FIG. 6. Step 804 can include identifying a time at which the regulation signal and/or battery power setpoint is predicted to be near zero (or at a minimum). The OCV measurement can be scheduled at the identified time so that disconnecting the battery will not significantly affect potential frequency response revenue.

In some embodiments, step 804 includes using the predicted regulation signal to determine an optimal frequency response. The optimal frequency response can be determined by frequency response optimizer 626, as described with reference to FIG. 6. In some embodiments, step 804 includes using the optimal frequency response to predict battery power setpoints. For example, step 804 can include using the optimal frequency response to determine an amount of power to store in the battery or discharge from the battery at each time step of an optimization period. Step 804 can include using the predicted battery power setpoints to identify the time at which the battery power throughput is zero or close to zero.

Process 800 is shown to include reducing the battery power setpoints at the scheduled time (step 806). In some embodiments, step 806 is performed by battery setpoint generator 616, as described with reference to FIG. 6. Reducing the battery power setpoint while one or more battery strings are disconnected has several advantages. For example, such a reduction in the battery power setpoint can prevent a large change in the SOC of the connected battery strings while one or more of the battery strings is disconnected. This helps reduce the difference in SOC between the connected and disconnected battery strings when the disconnected battery string is subsequently reconnected. Additionally, maintaining the battery strings at similar SOC values can limit the potential for electric arcing or fusing of the battery electrical connectors when the disconnected battery string is reconnected.

Process 800 is shown to include disconnecting the battery and measuring the open circuit voltage at the scheduled time (step 808). In some embodiments, step 808 is performed by switch controller 618, as described with reference to FIG. 6. Step 808 can include operating one or more switches that connect the battery to the rest of the system such that the switches open at the measurement time and disconnect the battery. The OCV of the battery can then be measured while the battery is disconnected.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An electrical energy storage system comprising:
a battery configured to store electrical energy and discharge the stored electrical energy to an external system;
a switch electrically connected to the battery and operable to connect the battery to the external system and disconnect the battery from the external system;
a sensor configured to measure an open circuit voltage of the battery while the battery is disconnected from the external system; and
a controller configured to:
predict a value of a regulation signal at each of a plurality of future times, the regulation signal indicating an amount of power requested, by an incentive provider, to be added to an energy grid from the electrical energy storage system or removed from the energy grid to the electrical energy storage system at each of the plurality of future times in exchange for frequency response revenue;
use the predicted values of the regulation signal to predict usage of the battery at each of the plurality of future times and identify a time of reduced battery usage, the time of reduced battery usage being a time of the plurality of future times at which the value of the regulation signal is predicted to be substantially zero or at a minimum value;
schedule the time of reduced battery usage as a time to disconnect the battery from the external system, thereby reducing an effect of disconnecting the battery on the frequency response revenue;
operate the switch to disconnect the battery at the scheduled time; and
obtain a measurement of the open circuit voltage of the battery while the battery is disconnected.

2. The electrical energy storage system of claim 1, wherein the controller is configured to estimate a state-of-charge of the battery based on the measured open circuit voltage of the battery.

3. The electrical energy storage system of claim 2, wherein the controller is configured to:
estimate an uncertainty in the state-of-charge of the battery; and
schedule the time to disconnect the battery in response to a determination that the estimated uncertainty exceeds an uncertainty threshold.

4. The electrical energy storage system of claim 1, wherein the controller is configured to:
determine a time of minimum battery usage based on the predicted usage of the battery at the plurality of future times; and
schedule the time to disconnect the battery at the time of minimum battery usage.

5. The electrical energy storage system of claim 1, wherein:
the external system comprises the energy grid; and
the controller is configured to use the battery to participate in a frequency response program by storing electrical energy from the energy grid in the battery and discharging the stored electrical energy to the energy grid.

6. The electrical energy storage system of claim 1, wherein the controller is configured to operate the battery to store and discharge electrical energy based on the regulation signal received from the incentive provider.

7. The electrical energy storage system of claim 1, wherein:
the external system comprises a building or campus configured to consume the electrical energy discharged from the battery; and
the controller is configured to use the battery to shift an energy load of the building or campus by storing electrical energy in the battery at a first time and discharging the stored electrical energy to the building or campus at a second time.

8. The electrical energy storage system of claim 7, wherein the controller is configured to:
operate the battery to store and discharge electrical energy to satisfy the energy load of the building or campus;
predict the energy load of the building or campus at each of the plurality of future times; and
predict the usage of the battery based on the predicted energy loads of the building or campus.

9. The electrical energy storage system of claim 1, wherein the controller is configured to:
operate the battery to store and discharge electrical energy to achieve battery power setpoints; and
estimate a state-of-charge of the battery based on the battery power setpoints.

10. The electrical energy storage system of claim 9, wherein the controller is configured to:
determine an initial state-of-charge of the battery based on the measured open circuit voltage of the battery;
estimate a change in the state-of-charge of the battery resulting from each of the battery power setpoints after the open circuit voltage is measured; and
estimate a current state-of-charge of the battery based on the initial state-of-charge of the battery and the estimated change in the state-of-charge of the battery.

11. A method for operating an electrical energy storage system, the method comprising:
storing electrical energy in a battery and discharging the stored electrical energy to an external system;
predicting a value of a regulation signal at each of a plurality of future times, the regulation signal indicating an amount of power requested, by an incentive provider, to be added to an energy grid from the electrical energy storage system or removed from the energy grid to the electrical energy storage system at each of the plurality of future times in exchange for frequency response revenue;
using the predicted values of the regulation signal to predict usage of the battery at each of the plurality of future times and identify a time of reduced battery usage, the time of reduced battery usage being a time of the plurality of future times at which the value of the regulation signal is predicted to be substantially zero or at a minimum value;
scheduling the time of reduced battery usage as a time to disconnect the battery from the external system, thereby reducing an effect of disconnecting the battery on the frequency response revenue;
operating a switch to disconnect the battery at the scheduled time; and
measuring an open circuit voltage of the battery while the battery is disconnected.

12. The method of claim 11, further comprising estimating a state-of-charge of the battery based on the measured open circuit voltage of the battery.

13. The method of claim 12, further comprising:
estimating an uncertainty in the state-of-charge of the battery; and
scheduling the time to disconnect the battery in response to a determination that the estimated uncertainty exceeds an uncertainty threshold.

14. The method of claim 11, wherein scheduling the time to disconnect the battery comprises:
determining a time of minimum battery usage based on the predicted usage of the battery at the plurality of future times; and
scheduling the time to disconnect the battery at the time of minimum battery usage.

15. The method of claim 11, wherein the external system comprises the energy grid;
the method further comprising using the battery to participate in a frequency response program by storing electrical energy from the energy grid in the battery and discharging the stored electrical energy to the energy grid.

16. The method of claim 15, further comprising operating the battery to store and discharge electrical energy based on the regulation signal received from the incentive provider.

17. The method of claim 11, wherein the external system comprises a building or campus configured to consume the electrical energy discharged from the battery;
the method further comprising using the battery to shift an energy load of the building or campus by storing electrical energy in the battery at a first time and discharging the stored electrical energy to the building or campus at a second time.

18. The method of claim 17, further comprising:
operating the battery to store and discharge electrical energy to satisfy the energy load of the building or campus;
predicting the energy load of the building or campus at each of the plurality of future times; and
predicting the usage of the battery based on the predicted energy loads of the building or campus.

19. An electrical energy storage system comprising:
a plurality of battery strings comprising a first battery string and one or more other battery strings, each of the battery strings comprising one or more batteries configured to store electrical energy and discharge the stored electrical energy to an external system;
one or more sensors configured to measure open circuit voltages of the battery strings when the battery strings are disconnected from the external system; and
a controller configured to:
predict a value of a regulation signal at each of a plurality of future times, the regulation signal indicating an amount of power requested, by an incentive provider, to be added to an energy grid from the electrical energy storage system or removed from the energy grid to the electrical energy storage system at each of the plurality of future times in exchange for frequency response revenue;
use the predicted values of the regulation signal to predict usage of the battery strings at each of the plurality of future times and identify a time of reduced battery usage, the time of reduced battery usage being a time of the plurality of future times at which the value of the regulation signal is predicted to be substantially zero or at a minimum value;
schedule the time of reduced battery usage as a time to disconnect the first battery string from the external system, thereby reducing an effect of disconnecting the first battery string on the frequency response revenue;
disconnect the first battery string at the scheduled time while keeping the other battery strings connected to the external system; and
obtain a measurement of the open circuit voltage of the first battery string while the first battery string is disconnected.

20. The electrical energy storage system of claim 19, wherein the controller is configured to estimate a state-of-charge of the first battery string based on the measured open circuit voltage of the first battery string.

* * * * *